(12) United States Patent
Lerch et al.

(10) Patent No.: US 7,417,541 B2
(45) Date of Patent: Aug. 26, 2008

(54) IDENTIFICATION BAND WITH REGIONS HAVING ELECTRO-MAGNETICALLY DETECTABLE REGIONS

(75) Inventors: John W. Lerch, Indialantic, FL (US); Joshua M. Girvin, Indialantic, FL (US); John P. Norair, Indialantic, FL (US)

(73) Assignee: Bartronics America, Inc., Melbourne, FL (US)

( * ) Notice: Subject to any disclaimer, the term of this patent is extended or adjusted under 35 U.S.C. 154(b) by 0 days.

(21) Appl. No.: 11/095,017

(22) Filed: Mar. 31, 2005

(65) Prior Publication Data

US 2006/0087437 A1 Apr. 27, 2006

Related U.S. Application Data

(60) Provisional application No. 60/617,518, filed on Oct. 8, 2004.

(51) Int. Cl.
*G08B 1/08* (2006.01)
(52) U.S. Cl. .......................... 340/539.31; 340/539.11; 340/572.1; 235/492
(58) Field of Classification Search ............. 340/539.11
See application file for complete search history.

(56) References Cited

U.S. PATENT DOCUMENTS

| 4,952,913 | A | * | 8/1990 | Pauley et al. ............. 340/573.4 |
| 5,448,846 | A | | 9/1995 | Peterson et al. |
| 5,457,906 | A | | 10/1995 | Mosher, Jr. |
| 5,892,454 | A | * | 4/1999 | Schipper et al. ........ 340/825.37 |
| 5,973,598 | A | | 10/1999 | Beigel |
| 5,973,600 | A | | 10/1999 | Mosher, Jr. |
| 5,979,941 | A | | 11/1999 | Mosher, Jr. et al. |
| 6,043,746 | A | | 3/2000 | Sorrells |
| 6,050,622 | A | | 4/2000 | Gustafson |
| 6,236,319 | B1 | | 5/2001 | Pitzer et al. |
| 6,782,648 | B1 | | 8/2004 | Mosher, Jr. |
| 6,888,509 | B2 | | 5/2005 | Atherton |
| 2003/0075608 | A1 | * | 4/2003 | Atherton ..................... 235/492 |
| 2003/0173408 | A1 | | 9/2003 | Mosher |
| 2004/0066296 | A1 | | 4/2004 | Atherton |
| 2004/0104274 | A1 | * | 6/2004 | Kotik et al. .................. 235/492 |
| 2004/0189470 | A1 | * | 9/2004 | Girvin et al. ............. 340/568.2 |

* cited by examiner

*Primary Examiner*—Benjamin C. Lee
*Assistant Examiner*—George A. Bugg
(74) *Attorney, Agent, or Firm*—Hamilton, Brook, Smith & Reynolds, P.C.

(57) ABSTRACT

An identification apparatus, such as may be incorporated into a band of material used as a wristband. An identification function is disposed in the band, along with an Electronic Article Surveillance (EAS) function, that may be selected to be at least one of an electro-magnetic or acousto-magnetic segment. The identification function is typically a Radio Frequency Identification (RFID) device. The EAS function segment operates independently of the RFID device, so that the presence or absence of one or more EAS segments can be detected without affecting the RFID function operation. In one embodiment, multiple segments are disposed on the band, with at least one segment having a different characteristic physical property than at least one other segment. The multiple segments may be formed on an upper and lower surface of the band, such that they overlap with one another in a vertical plane.

19 Claims, 8 Drawing Sheets

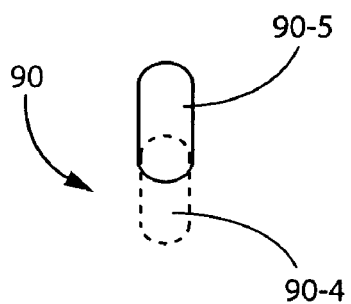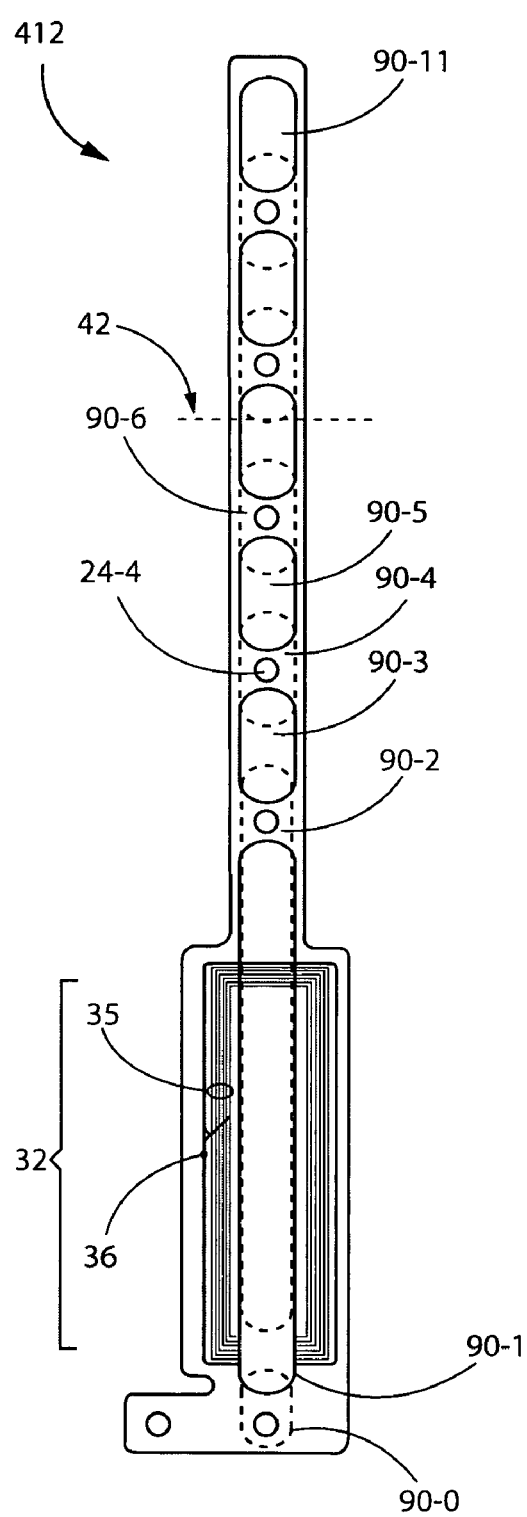

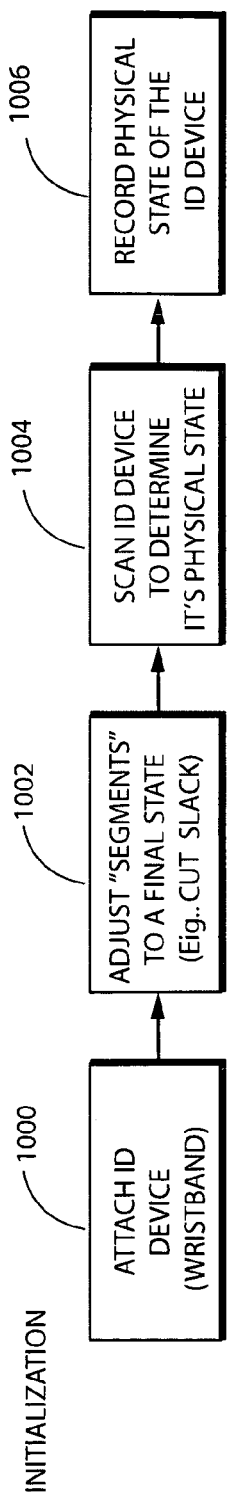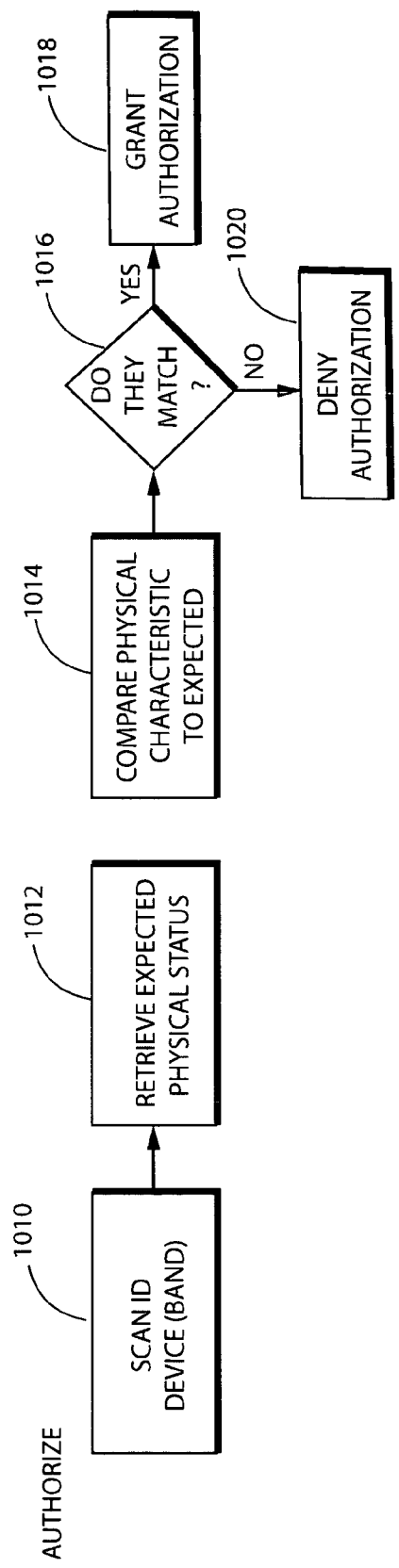

IDENTIFICATION BAND WITH REGIONS HAVING ELECTRO-MAGNETICALLY DETECTABLE REGIONS

RELATED APPLICATION(S)

This application claims the benefit of U.S. Provisional Application No. 60/617,518, filed on Oct. 8, 2004. The entire teachings of the above application are incorporated herein by reference.

BACKGROUND OF THE INVENTION

Various technologies have been applied to the so-called Electronic Article Surveillance (EAS) marketplace. EAS "tags" are commonly used to control inventory in a retail sales environment. For example, a store selling expensive leather coats may attach EAS tags to each coat to prevent theft.

EAS systems invariably use one or more of three different basic schemes. Some tags are, for example, Radio Frequency (RF) based. These devices operate by detecting a radio signal reradiated by a resonant marker in response to a field applied to a designated interrogation zone.

Still other systems include electromagnetic markers (EM) that may, for example, make use of magneto-restrictive elements. Such types of EAS systems are based on markers that include a thin strip or wire of magnetic material that responds to an alternating interrogation signal by generating a signal pulse at a higher harmonic of the interrogation signal.

Still further systems may make use of other types of radiation, such as acousto-magnetic (AM) energy.

Thus EAS tags have been developed that use various types of radiation, including RF, EM and AM, for operation.

Certain prior art identification bands have been made tamper proof by including a disabling wire in the band. For example, in a co-pending U.S. patent application Ser. No. 10/400,049 on Mar. 26, 2003 by Girvin, J., and Lerch, J., entitled "Non-Reusable Identification Device", assigned to Proximities, Inc., the assignee of the present application, a disabling wire is run along the band and is connected to disable a transponder if the wire is cut. Thus, the band of material must remain intact for the identification function to operate.

SUMMARY OF THE INVENTION

The present invention is an approach to providing a tamper-resistant identification device that can be sized to fit the wrist or other limb of a wide variety of persons without causing discomfort or difficulties with the tamper detection or communication capabilities of the device. The present invention provides a tamper detection technique that is more difficult to defeat than those known in the prior art.

One shortcoming of prior art is the use of a tamper detection mechanism that necessarily prevents the identification device from communicating any identification information, whether or not the tampering occurred accidentally or intentionally. This occurs because the tamper detection mechanism works by preventing the identification mechanism from transmitting or receiving information. One example of where this is potentially problematic is in a patient identifying setting, such as a hospital, where information stored on a Radio Frequency Identification (RFID) apparatus might be critical to the proper treatment of a patient. In former designs of wristbands that use disabling wires, this information is not accessible if the band has been cut.

Another shortcoming of prior disabling band designs is the possibility that they can be repaired after they have been removed or tampered with. In previous designs, a conductive trace made of etched copper, printed conductive ink, electrodeposited copper, or the like is run along the length of the band. If the band is cut, torn or stretched then this conductive trace is severed, thereby restricting current flow to the RFID circuit or otherwise causing the circuit to cease transmitting information. However, repairing this trace, with a piece of tinfoil, a conductive ink pen, solder, or some other method, may reenable such a band, creating the potential for fraudulent use.

In particular, when conductive tamper detection traces (also referred to in prior art as disabling wires) are coupled to the RFID circuit itself, the resulting overall circuit must maintain an appropriate impedance such that the RFID circuit can continue to transmit information. In other words, the quality factor, or Q, of the circuit must be such that enough bandwidth is provided to transmit RFID information. However, a tamper-detection circuit with a high Q is desirable. A higher Q circuit requires higher precision in reconnecting traces, thereby making the circuit more difficult to repair.

The present invention is an identification apparatus, such as may be incorporated into a band of material used as a wristband. An identification device is disposed in the band, together with a tamper detection device. The identification device is typically a Radio Frequency Identification (RFID) device. The tamper detection device may be an Electronic Article Surveillance (EAS) segment, such as at least one RF resonant circuit, a magnetic resonant material segment, a nano-resonant structure, or an acoustic resonant material segment.

The invention thus decouples the tamper detection function from the identification function. Thus, when the wristband is removed from the person accidentally or intentionally, causing destruction of the tamper detection device, the identification information is still available.

In preferred embodiments, the tamper detection EAS segment operates independently of the RFID device. For example, the presence or absence of one or more EAS segments can be detected regardless of whether or not an RFID device is still operating.

In a preferred embodiment, multiple EAS segments are laid out in a manner such that alterations to the wristband indicative of tampering will necessarily change the physical response of one or more EAS segments. In this manner, tampering can be detected without interaction with or coupling to the RFID circuit.

In one embodiment, multiple EAS segments are disposed on the band, with at least one segment having a different characteristic physical property than at least one other segment. These multiple segments may be formed on an upper and lower surface of the band, such that they overlap with one another in a vertical plane.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 4A and 4B illustrate another embodiment of the present invention using EAS functional unit elements.

FIGS. 8A and 8B are flow diagrams for processes which may be used to verify that the bands of FIGS. 1-7 have not been tampered with.

DETAILED DESCRIPTION OF PREFERRED EMBODIMENTS

A description of preferred embodiments of the invention follows.

Figure 1:
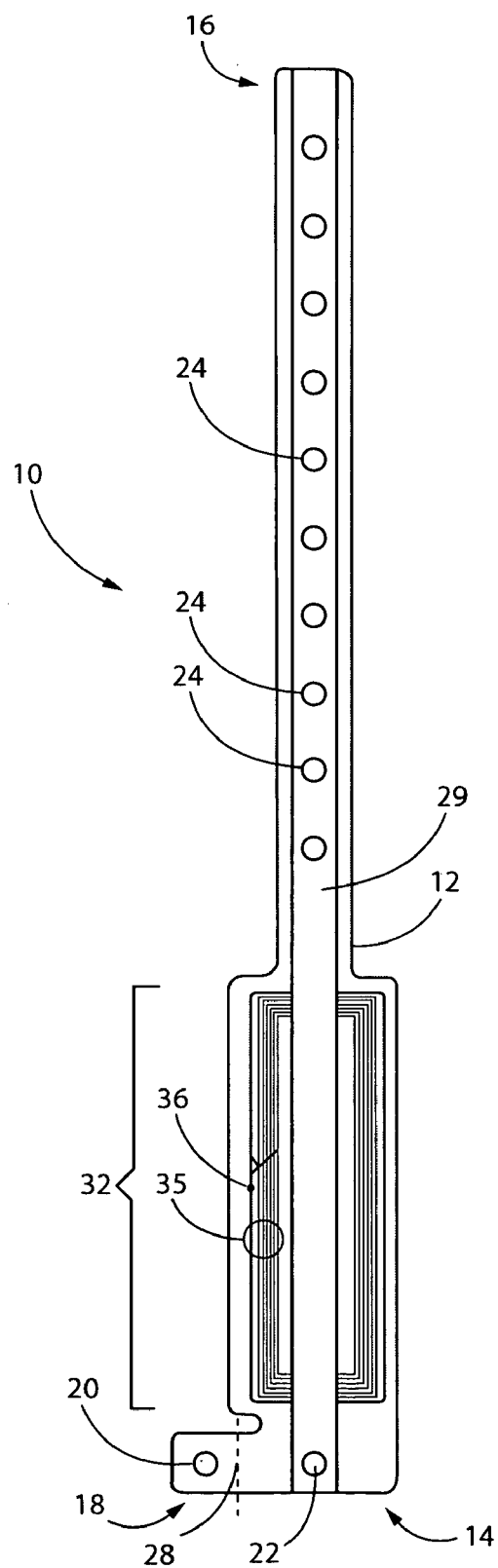
FIG. 1 is a schematic diagram of a Radio Frequency Identification (RFID) wristband according to the present invention.

FIG. 1 is a general illustration of a Radio Frequency Identification (RFID) apparatus 10 in the form of elongated band 12 with opposite ends 14 and 16. The ends 14, 16 are brought together and fastened to form a closed loop. While FIG. 1 shows the apparatus 10 embodied as a bracelet (wristband) that is intended to fit around a person's wrist, it will be understood after reading the following detailed discussion that the principals of the present invention may also be applied to other devices such as anklets, to tags intended to be attached to clothing or to luggage, or in similar applications where a thing needs to be electronically monitored.

In the illustrated embodiment, the band 12 uses a mechanical non-reusable tamper-resistant locking mechanism 18 to fasten the opposite ends 14, 16 together, and to thereby prevent the user from attempting to remove the band 12 without also rendering those tampering efforts visually obvious.

Bracelet 10 also includes a transponder circuit 32 that includes at least an antenna 35 and an RFID integrated circuit chip 36. As is well known in the art, transponder circuit 32 receives an RF interrogation signal via the antenna 35 from an external RFID reader (not shown in the drawings). In response thereto, the transponder circuit 32 then emits RF interrogation response signal. The interrogation response signal may contain information that is pre-stored or pre-programmed in the integrated circuit chip 36. For example, the information could include the date the band 12 is issued, the date it will expire and will not longer be usable for access, the age status of the wearer, and whether the bracelet 10 can be used for purchasing goods or services. Any other desired information, depending on the context in which the band 12 is to be used, may be pre-stored or pre-programmed in the circuit chip 36. Information stored in the integrated circuit chip 36 could also be used as an index to information in a database, for example.

The RFID transponder circuit 32 is preferably of the passive type such that it does not use a battery or other separate voltage or current source to operate. For such passive RFID transponder circuits 32, then, power for the integrated circuit chip 36 is derived from the RF signals received via the antenna 35.

The antenna 35 may be embodied as a conductive coil that surrounds or is located near the integrated circuit chip 36. Antenna 35 is preferably, but not necessarily, made from printed conductive ink that is robust enough to withstand normal handling but fragile enough that it will be broken if a user attempts to remove the bracelet. Alternatively, antenna 35 may be a thin wire such as copper wire, a thin foil, or other suitable electrically conductive material. The antenna can be manufactured using a positive deposition process or a subtractive etching process, among other techniques.

Also contained on band 12 is at least one other element 29, used in the present invention as a tamper detection device, such as a piece of EAS material. In the embodiment of FIG. 1, the EAS element 29 is implemented as a strip of material disposed along substantially the entire length of band 12. The EAS element 29 is utilized to detect tampering in a manner that will be explained in detail, later on.

First, a description of the typical use of locking mechanism 18 will help in understanding the advantages provided by the EAS element 29. As best shown in the perspective view of FIG. 2, the locking mechanism 18 can be composed of a barbed peg 20 and a locking hole 22 in flap 28 at end 14 of said band, and a selected one of several adjustment holes 24 positioned along the band 12. Adjustment holes 24 are used to adjust the diameter of band 12 to conform to body parts of different circumferences. When ends 14, 16 are brought together, the barbed peg 20 is arranged to pass through a selected adjustment hole 24 as required for a snug fit. The flap 28 is then folded along imaginary line 26 and the barbed peg 20 is then passed through locking hole 22.

Peg 20 is shaped with barbs that resist removal from the locking hole 22 without also destroying the locking mechanism 18 and rendering it incapable of being refastened. Alternatively, or in addition, adjustment holes 24 can be designed to replace or supplement locking hole 22 by configuring them in such a way that any attempts to remove the bracelet from the barbed peg 20 would also destroy the adjustment hole 24, thereby disabling the bracelet and rendering it incapable of being refastened.

Figure 2:
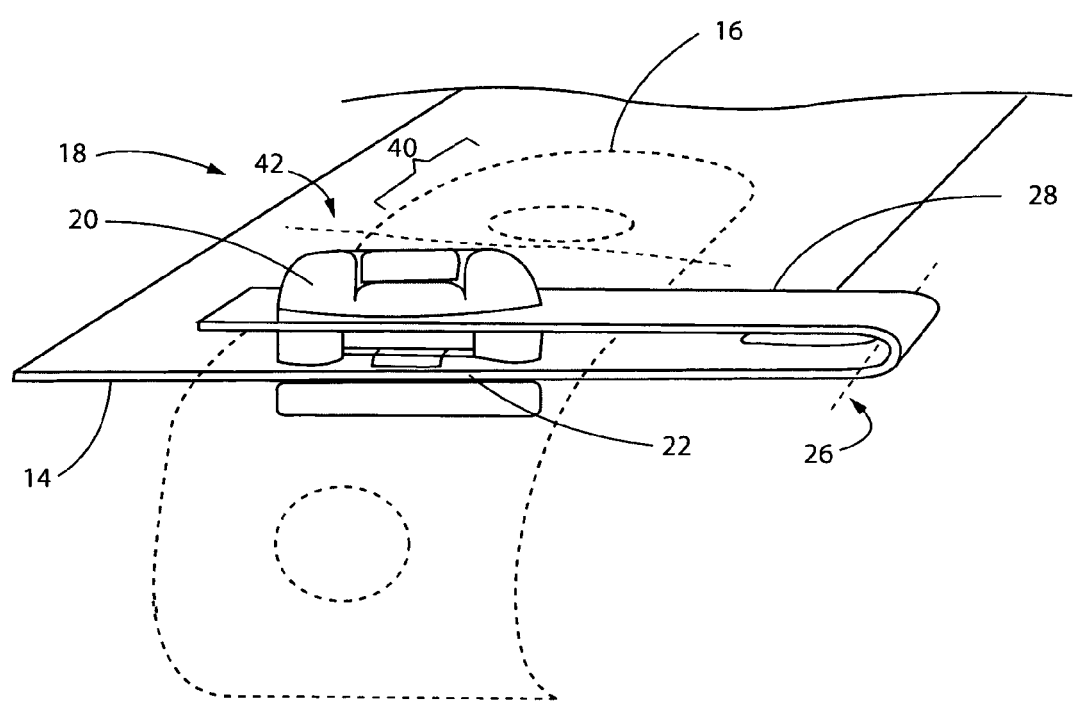
FIG. 2 is a perspective end view showing the barbed peg and locking hole arrangement and how the end of the strip is typically cut.

As can be seen from FIG. 2, and end section 40 of the far end 16 of the band is then left protruding from the point where the locking mechanism 18 is assembled. For reasons of comfort, as well as past custom, when using plastic, non-RFID wristbands it becomes desirable to cut off end section 40, such as along imaginary line 42. This prevents the end section 40 from irritating the wrist or interfering with the persons' clothing. However, with past disabling wristband designs, such a cut along line 42 could possibly alter the operation of the RFID transponder 32, or tamper detection functions making the band 12 useless.

Shown in FIG. 3 in more detail are further aspects relevant to the present inventions herein, which allow the user to cut the band 12, while still maintaining the capability of detecting later tampering. As mentioned already above, albeit just briefly, the band 12 is augmented with an EAS element 29 that may comprise one or more EAS zones 80. A zone 80 may contain one or more EAS segments of the type used in the manufacture of Electronic Article Surveillance (EAS) tags.

The EAS segments may take many different forms. What is important is that the EAS segments emit a detectable tamper signal when exposed to certain types of radiation, such as electromagnetic radiation or acousto-magnetic radiation, that is distinguishable from the RF emissions of the RFID transponder 34. The EAS segments may radiate in an acoustic, RF, millimeter wave, infrared, visible, or other radiation bands. Preferably, though not necessarily, the EAS segments used are of the type that respond to a higher RF frequency, thus requiring a smaller antenna on the interrogation device. Other desirable characteristics include a high level of difficulty in repairing a cut or torn segment, and commercial availability at low cost.

An example of a suitable commercially available EAS segment for use in an acousto-magnetic variant of the invention is a magneto-restrictive piece of material that responds to pulses of RF on the order of tens of kHz (e.g. 60 Hz). The resulting magnetic field causes the piece of material to physically shrink and/or expand, thus emitting a resonating signal much like a tuning fork, which can then be detected by an interrogator.

In an electromagnetic (EM) variant, material with high magnetic permeability is used. The presence of such materials are typically detected with a lower frequency electromagnetic signals, generally ranging from 70 Hz to 1 kHz.

Another commercially common EAS segment is a simple RF resonant circuit, similar to that used in high frequency RFID circuits. A coiled antenna coupled to a capacitor is tuned to a frequency at which it resonates as a result of excitation from an applied RF field. RF EAS segments used in this invention are typically tuned to frequencies between 2 and 10 MHz.

Another existing EAS technology that is not yet widely deployed may also be suitable for this purpose. This technology utilizes an RF substrate with "nano-resonant structures" (NRS) deposited therein. NRS emit a unique resonant pattern or signature in response to millimeter waves. This response is detectible using an RF sensor, and thus can be used in the same manner as the aforementioned EAS technologies.

What is important is that the EAS segments operate in a region of the electromagnetic spectrum that is different from the region of operation of transponder circuit 32. As such, emissions from the EAS segments are distinguishable from those of the RFID transponder circuit 32, and the two functions thus operate independent of one another.

FIG. 4A is a more general depiction of a band 412 that uses multiple EAS segments 90. In particular, the band 412 here is formed with multiple EAS segments 90-0, 90-1, 90-2, 90-3, 90-4, 90-5, 90-6, 90-7, . . . 90-11 that individually exhibit identifiable and likely different physical characteristics, which may include RF, magnetic, acoustic or other detectable properties. In the illustrated embodiment, the EAS segments 90 may each be an RF circuit that has a response that is different from the other EAS elements 90 on the band 412, or even different from the EAS segements used on other bands 412. For example, EAS segment 90-0 may resonate at a frequency F0, segment 90-1 at a frequency F1, segment 90-2 at a frequency F2, segment 90-3 at a frequency F3, and so forth.

As shown in the more detailed view of FIG. 4B, certain EAS segments such as segment 90-4 are preferably disposed on one surface of the band 412 (such as a lower surface) and other segments 90-5 are disposed on a second surface of the band 12 (such as an upper surface). For the band 412 shown in FIG. 4A, even numbered EAS segments 90-0, 90-2, 90-4, 90-6, . . . , 90-10 are located on the lower surface and odd numbered segments 90-1, 90-3, 90-5, . . . , 90-11 on the upper surface. The segments 90-A and 90-B may be aligned such that they overlap with one another at least partially. This makes it physically impossible to cut the band 412 laterally, without also cutting through at least one portion of at least one EAS segment 90.

While the embodiment of FIGS. 4A and 4B has segments 90 on two different surfaces provided by the two sides of a single layer band 412, it should be understood that they may be disposed on different layers of a band that was formed of multiple layers of material, or may also be disposed on the same surface of a single layer band, as long as they are in close proximity to one another.

When the band 412 is installed on a person, as previously described in connection with the band 12 shown in FIG. 2, the end 16 of the band 12 is wrapped around the wrist allowing one of the holes 24 to be engaged by peg 20. Once secured in this fashion, an excess portion of the band can then be cut, such as along dashed line 42.

However, even as now cut, the band 412 can then be scanned to determine that only EAS segments 90-0, 90-1, . . . , 90-6 are still present on band 412. The scan results can then be stored as data representing the physically measured resonant characteristics or "profile" of band 12. The data may then be stored on the chip 36 itself and/or external data processing equipment associated with reading the band 412 and/or other data processing equipment used to engage in an electronic transaction. For example, in a later transaction, a band exhibiting the particular identification information will only be accepted if it exhibits the same response of EAS segments 90-0, 90-1, . . . , 90-6 as previously measured and stored.

This EAS profile information can thus be used in connection with determining if the band 12 has been tampered with. For example, any cut, slit, stretching, or other measure taken to remove band 412 from a wearer will result in an alteration to the electromagnetic properties of at least one of segments 90-0, 90-1, . . . 90-6. When band 412 is later scanned for the presence of EAS elements, the resulting profile results will not match the profile that was recorded at the time it was installed on its person. Therefore, a system that is designed to work in conjunction with band 412 would be able to detect tampering by comparing its current EAS profile with the EAS profile that was recorded at issuance.

A slit, cut, re-solder, re-glue or other attempt to repair the band 412 will alter the physical characteristic information of one or more of the individual EAS segments 90. Thus, for example, if the user attempts to reuse a band 412 by only making a small or partial slit near hole 24-4, such a slit will cause a change in the RF radiation characteristic of segment 90-4. This change of the RF characteristic can be detected when the band 412 is scanned again, which can be at the time the band is attempted to be used for a purchase or access control, for example. At this point, the RF profile of the band 412 now being different from the previously stored profile, the tampering is evident.

This arrangement affords various advantages over the previous embodiments described above. For example, it allows tamper detection functionality in such a way that it does not interfere with the ability of the band 412 to provide or to transmit data to a reader. This in effect decouples the identification function from the tamper detection function.

A band 412 such as that shown in FIG. 4A also allows trimming to correctly fit the wrist size of a wide variety of users without causing difficulty with the tamper detection functionality. Certain previously described embodiments require that continuous traces be provided running the entire length of the band and/or placing RFID chips remote from an antenna. These are problematic in that they cannot be trimmed without destroying their functionality.

In a patient identification setting, such as a hospital, the information stored on transport circuit 32 might be critical to the treatment of a patient. In former designs of wristbands that use disabling wires coupled to the RFID circuit, this information would not be accessible after the band has been cut or damaged, whether intentionally or accidentally. However, in this new design, when the wristband is removed from the patient, RFID identification information is still available from the band 412 itself by reading the RFID transponder 32. In a health care environment, this information might be so critical as to save a patient's life, for example. Even in other situations, such as when the band 412 is associated with a credit or debit card and used for enabling purchases, having the identification information for a tampered band 412 can assist with determining if the tampered band should be reauthorized, such as by re-scanning its EAS profile, or to determine if the associated account may have been compromised because of unauthorized activity. Further, this end is met without forfeiting the ability to detect tampering or potential transference.

It should be understood that similar functionality can be provided in different ways. For example, while the band 412 in FIG. 4A has been described as having multiple EAS functional units or segments 90-1, . . . ,90-11 on band 12, it should be understood that continuous or "analog" version of a band can be provided, as well. As shown in the embodiment of FIG. 1, a similar band 12 has a single EAS element (or segment) 29 that is a continuous piece of electromagnetic material. This provides a characteristic of a continuous type. The single electromagnetic element 29 is configured as a contiguous piece of electromagnetic material. The single element 29 is still identifiable when cut, since when cut in different lengths it will exhibit different physical characteristic profiles. For example, its frequency response would be expected to vary with the length of the band 12, and to be different from what it was originally, when it is cut. Further, repairing a band 12 such as that shown in FIG. 1 is still much more difficult than in designs that utilize a conductive trace coupled directly to the RFID circuit.

Thus, like in the previous embodiment, when bands 12, 412 or even the embodiments to be dicussed in connection with FIGS. 5A, 5B, 6, and 7 are cut to fit wrists of different sizes, the different lengths of electromagnetic material segment 90 would exhibit different characteristics, providing tamper detection by matching measured against stored profile information.

While the bands 12 and 412 as shown in FIGS. 1-4 are of the type that use holes 22, 24 and peg 20 for fastening, it should be understood that the same characteristic profile information can be derived from other types of bands, such as those that use adhesives to fasten the ends 14, 16 together.

Figure 3:
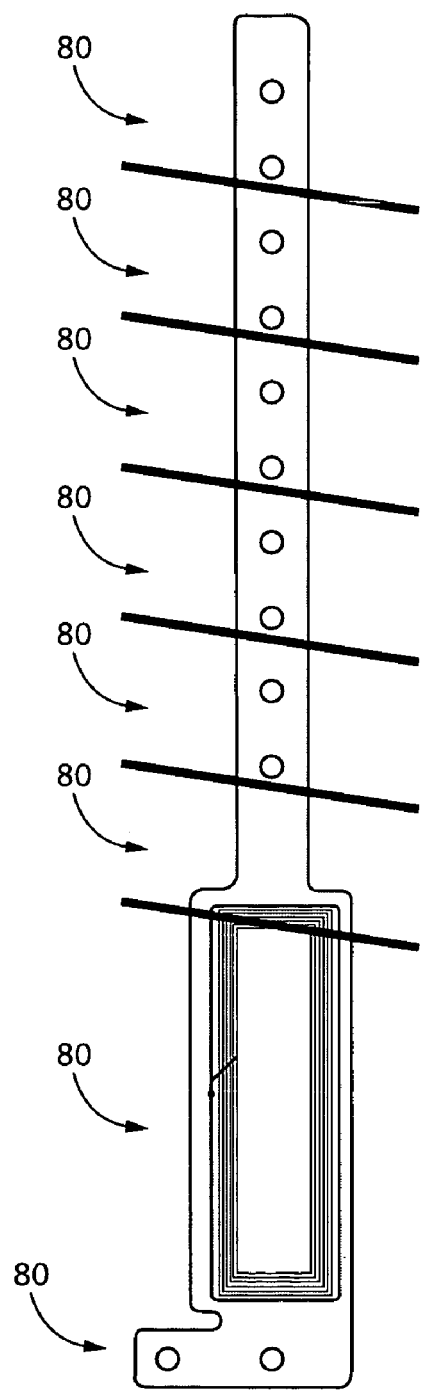
FIG. 3 is a general diagram of a wristband having multiple EAS zones according to the present invention.
Figure 5A:
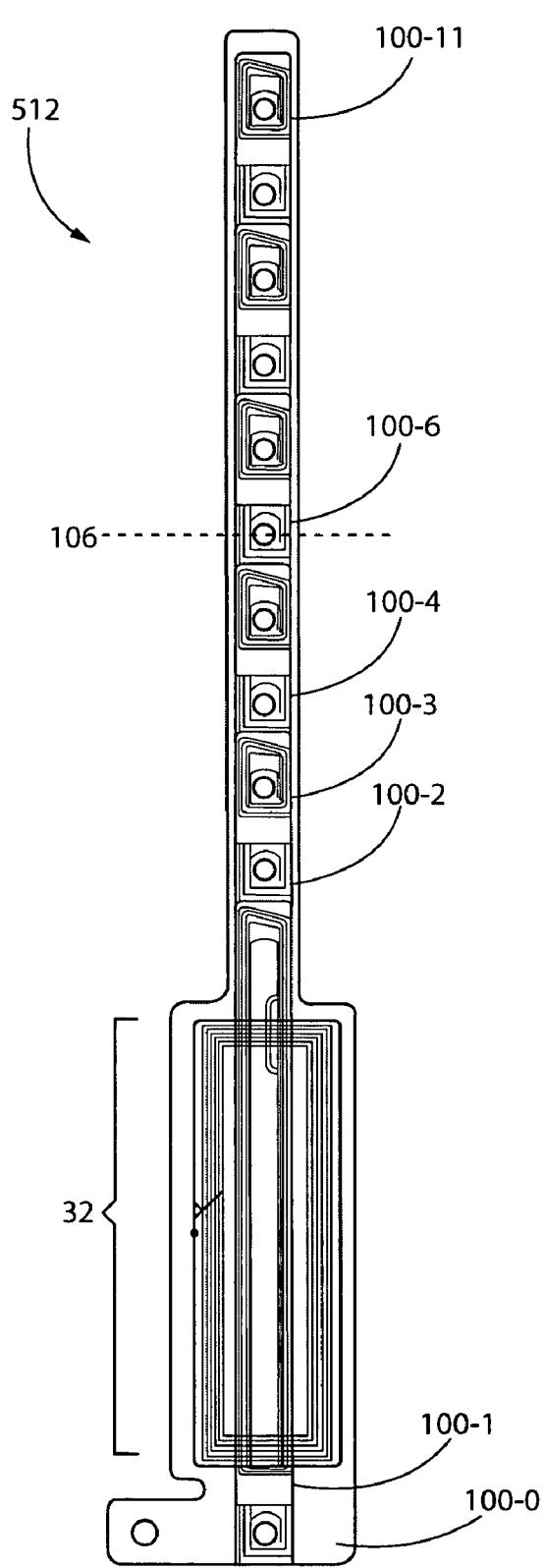
FIGS. 5A and 5B illustrate still another embodiment using wire coils as the EAS elements.
Figure 5B:
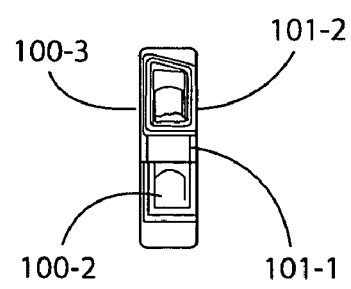

FIG. 5A shows another possible implementation of a band 512 that also uses the techniques outlined by FIG. 3. Here, the segments are made up of individual RF resonant circuits 100 which may overlap one another as shown in the detail of FIG. 5B. The individual circuits may be principally composed of an outwardly spiraling wire loop and a capacitive plate element. Circuits 100-1, 100-2 . . . 100-11 are each overlapped by at least one adjacent circuit 100. In a preferred embodiment, the overlap is arranged such that capacitor plate 101-1 of a first section 100-2 is overlapped by wire loop portions 101-2 of adjacent section 100-3.

Unlike designs where the identification function is coupled to the tamper detection function, the RF EAS segments (embodied as circuits 100) can be designed with a high Q. This is because they do not require the bandwidth to transmit information that RFID circuits require. This makes attempts to repair an RF EAS segment 100 more readily detected than a repair made on an RFID circuit 32. For example, a new joint made by soldering or gluing two parts of a severed RF EAS segment 100 will necessarily change its characteristic impedance, shifting the resonant frequency of the RF EAS segment by a detectable degree.

Thus, one can readily see that a cut made along line 106 and then an attempted repair will cause the characteristic RF resonant frequency of section 100-6 to change. After reading all of the RF EAS segments 100, the tampering will be detected.

This specific arrangement makes it furthermore quite difficult to repair once removed, since a capacitive plate would have to be repaired precisely, or multiple wire elements would have to be carefully aligned along more than one axis in order to reconstruct the original configuration.

Figure 6:
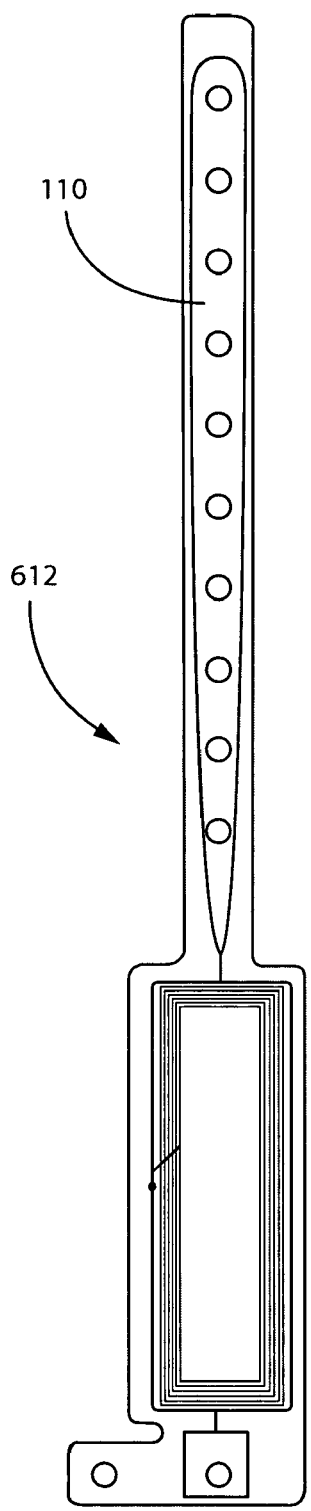
FIG. 6 is a view of yet another embodiment using a tapered EAS material section.

FIG. 6 shows another embodiment as a band 612 which provides different physical characteristics depending upon its length. In this embodiment, the EAS segment is formed as a capacitive plate 110 that has a shape which tapers along the length thereof. Thus, when the band is cut at different positions along its length, the plate 110 will exhibit different RF impedances. Thus, the band's RF profile will also be different for different lengths.

Figure 7:
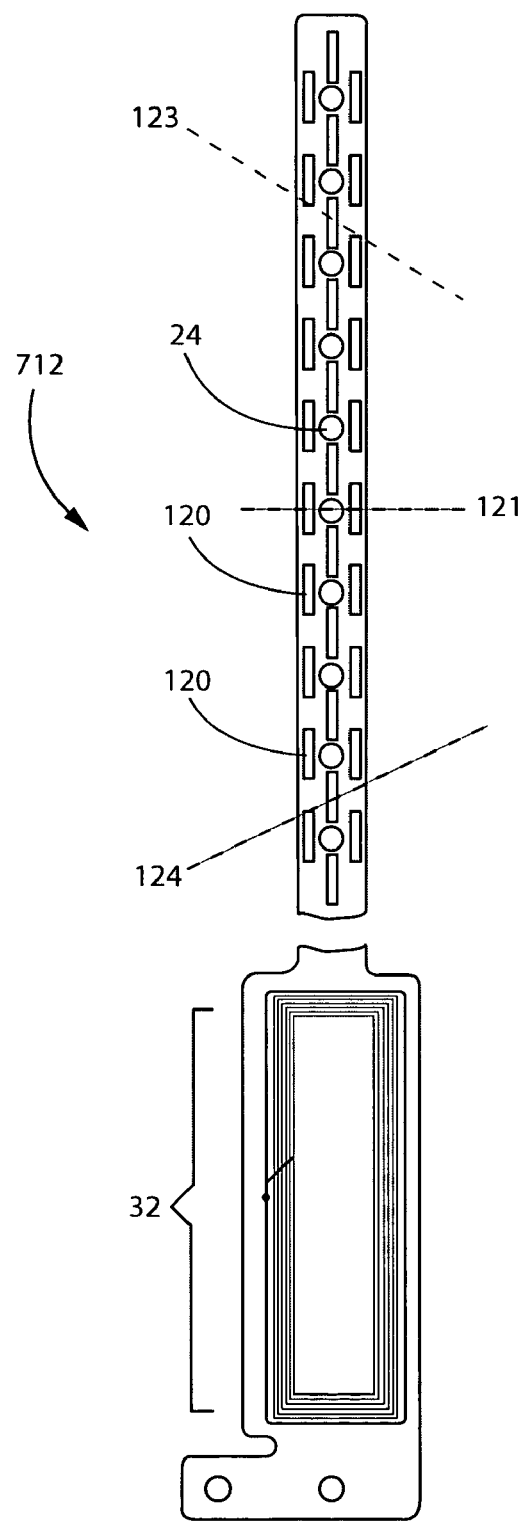
FIG. 7 is an embodiment of the present invention where multiple small pieces of EAS material are disposed on the band.

In other embodiments, a detectable electromagnetic profile can be provided from individual small EAS segment pieces 120 distributed horizontally and vertically along a band 712 as shown in FIG. 7. It is important only that they form essentially a continuous strip from an electromagnetic standpoint. Such an implementation made from individual short pieces 120 might be easier, less expensive, or desirable for the purposes of manufacture. This configuration should be such that it is impossible to cut through at least one of the pieces 120 without also inflicting a change in the profile. For example, any cut line, such as cut line 121, cut line 123, or even cut line 124 cannot be made without passing through at least one of the pieces 120. In other words, the layout of the individual pieces 120 should be such that it is guaranteed that when band 712 is cut, the electromagnetic profile of the band will change at least enough such that the change can be detected by the available electromagnetic profile reading equipment.

Although not depicted in detail in the drawings, it should be understood that a given single band 12, 412, 512, 612, 712, etc. may have some EAS segments that are of the RF type, others of the magnetic type, and/or still others of the acoustic type.

FIGS. 8A and 8B illustrate methods of using identification bands that have identifiable physical characteristic profiles according to the present invention. Such methods can make use of the physical characteristic profile information to determine if the band has been tampered with and/or to further engage in electronic transactions.

In connection with the first method as shown in FIG. 8A, as a first step 1000 for initialization, the wristband identification device, such as band 12 is attached to the wrist of the user. In the next step 1002, segments of the band 12 are adjusted to a final state. For example, in this step, the band is wrapped around the wrist of the user and a peg is pushed through one of the holes 24 and secured. In the next step 1004, the identification device is scanned by the physical characteristic profile reader device to determine its physical state.

Thus, for example, in the configuration that was described in FIG. 4 with a cut along dash line 91, the physical state will read the frequency of elements 90-0, 90-1, 90-2, 90-3, . . . 90-6 etc. and potentially even record the fact that elements 90-7, 90-8, . . . , 90-11 are no longer present on the band 12. The profile information of the device is then recorded in step 1006. This recordation can be done on the RFID circuit 35 itself and/or in data storage equipment associated with operating the RFID reader.

FIG. 8B shows a sequence of steps for authorizing use of the identification device. In a first step 1010, the identification device is scanned using a reader. The scan produces the present state of the device in terms of its profile. In step 1012, the expected profile is retrieved as was stored in step 1006. In step 1014, the measured profile, that is the profile that was measured in step 1004, is compared against the expected profile in step 1016. If these match, then authorization can be granted in state 1048. If these do not match, however, in state 1020 authorization for use of the band can be denied. This sequence of steps thus provides a further way in which to prevent unauthorized use of a band after it has been tampered with in such a way that the physical characteristics of the band are altered.

Methods and techniques as described herein could also be utilized in applications that require secure identification for entities other than human beings. For example, the same band apparatus, scanning system, and methods could be utilized to secure a piece of luggage or cargo. This would be an improvement over prior art that utilizes conductive traces coupled to an identification apparatus to detect tampering. As in the applications relating to human identification, such a technique can be repaired. Further, intentional or unintentional tampering with said apparatus would render the identification function inoperable, thus sacrificing efficiency and functionality for security. In some instances, security might be compromised to a degree, as well, because the entity being secured would no longer be detected by the identification means being utilized. As such, the secured object could be transported, misplaced, or removed from a location without detection.

Still other modifications to the preferred embodiments described above are possible. For example, the transponder can be provided by certain devices other than circuits, such as acoustic resonant devices. In addition, the RFID circuit functions may be implemented by printing or depositing elements on other types of substrates or materials, other than as integrated circuit chips 36.

While this invention has been particularly shown and described with reference to preferred embodiments thereof, it will be understood by those skilled in the art that various changes in form and details may be made therein without departing from the scope of the invention encompassed by the appended claims.

What is claimed is:

1. An identification apparatus, comprising:
    a band of material;
    an identification device attached to said band and responsive to a first signal; and
    at least one tamper segment attached to said band that is responsive to at least one of an electro-magnetic and acousto-magnetic second signal wherein said identification device functions independently of said tamper segment.

2. An apparatus as in claim 1 wherein said identification device is a Radio Frequency Identification (RFID) device.

3. An apparatus as in claim 1 wherein said tamper segment responds to radiation in a spectral band that in different from a spectral band to which said identification device responds.

4. An apparatus as in claim 1 wherein said tamper segment comprises an element selected from a group consisting of a Radio Frequency (RF) resonant circuit, a nano-resonant structure, a magnetic resonant material, and an acoustic resonant material.

5. An apparatus as in claim 1 wherein a cut through the band changes an electro-magnetic and/or acousto-magnetic response of said tamper segment.

6. An apparatus as in claim 1 wherein one or more tamper segments and said identification device span the entire length of the band.

7. An apparatus as in claim 1 wherein multiple tamper segments are disposed on the band.

8. An apparatus as in claim 7 wherein at least two tamper segments overlap one another.

9. An apparatus as in claim 7 wherein at least one tamper segment has a different characteristic response than at least one other taper segment.

10. An apparatus as in claim 7 wherein at least two tamper segments are disposed on different surfaces of the band.

11. An apparatus as in claim 10 wherein at least two tamper segments are disposed on two different horizontal surfaces of the band, and are aligned with one another such that at least a portion of a first segment overlaps a portion of a second segment in at least one vertical plane.

12. An apparatus as in claim 1 wherein the tamper segments are selected from a group consisting of a wire loop, a tapered piece of material, or multiple material pieces.

13. A secure identification system, comprising:
    at least one identification band comprising:
        a band of material;
        an identification device disposed on the band that is responsive to a first signal;
        at least one segment formed along the identification band that is responsive to a second signal, wherein at least one segment functions independently of the identification device, and wherein at least one segment responds to the second signal differently after it has been altered; and
    an interrogation device, for emitting the second signal to which the at least one segment responds.

14. A system as in claim 13 wherein the identification device is a Radio Frequency Identification (RFID) device comprising an antenna coupled to an integrated circuit.

15. A system as in claim 13 wherein the second signal is selected from a group consisting of a radio frequency wave, an electromagnetic wave, or an acousto-magnetic wave.

16. A system as in claim 13 wherein one or more segments and/or identification devices are disposed on said band to span substantially the entire length of said band.

17. A system as in claim 13 wherein said interrogation device also generates the first signal.

18. An identification apparatus, comprising:
    a band of material;
    a Radio Frequency Identification (RFID) device attached to said band, the RFID device being responsive to a first signal; and
    at least one tamper segment, attached to said band, and formed of at least one of an electro-magnetic and acousto-magnetic material that is responsive to a second signal.

19. An apparatus as in claim 18 wherein said first signal has spectral properties that are different from said second signal.

* * * * *

UNITED STATES PATENT AND TRADEMARK OFFICE
CERTIFICATE OF CORRECTION

PATENT NO. : 7,417,541 B2
APPLICATION NO. : 11/095017
DATED : August 26, 2008
INVENTOR(S) : John W. Lerch, Joshua M. Girvin and John P. Norair It is certified that error appears in the above-identified patent and that said Letters Patent is hereby corrected as shown below:

Claim 3, column 9, line 53, delete "in different", and insert --is different--.

Claim 9, column 10, line 13, delete "taper", and insert --tamper--.

Claim 11, column 10, line 16, insert --the-- after the word "wherein".

Claim 13, column 10, line 31, delete "at least", and insert --the at least--.

Claim 13, column 10, line 32, delete "at least", and insert --the at least--.

Claim 13, column 10, line 36, delete "at least one".

Claim 18, column 10, line 51, delete "being".

Claim 18, column 10, lines 56 through 57, insert after "signal" --and wherein said tamper segment functions independent of said RFID device.--.

Claim 20, column 10, line 59 through line 60, insert --An apparatus as in claim 1, wherein said second signal is one of an electromagnetic or acousto-magnetic signal.--.

Signed and Sealed this

Nineteenth Day of May, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,417,541 B2 Page 1 of 1
APPLICATION NO. : 11/095017
DATED : August 26, 2008
INVENTOR(S) : John W. Lerch, Joshua M. Girvin and John P. Norair It is certified that error appears in the above-identified patent and that said Letters Patent is hereby corrected as shown below:

Claim 3, column 9, line 53, delete "in different", and insert --is different--.

Claim 9, column 10, line 13, delete "taper", and insert --tamper--.

Claim 11, column 10, line 16, insert --the-- after the word "wherein".

Claim 13, column 10, line 31, delete "at least", and insert --the at least--.

Claim 13, column 10, line 32, delete "at least", and insert --the at least--.

Claim 13, column 10, line 36, delete "at least one".

Claim 18, column 10, line 51, delete "being".

Claim 18, column 10, lines 56 through 57, insert after "signal" --and wherein said tamper segment functions independent of said RFID device.--.

Claim 20, column 10, line 59 through line 60, insert --An apparatus as in claim 1, wherein said second signal is one of an electromagnetic or acousto-magnetic signal.--.

Signed and Sealed this

Second Day of June, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,417,541 B2  Page 1 of 1
APPLICATION NO. : 11/095017
DATED : August 26, 2008
INVENTOR(S) : John W. Lerch et al.

It is certified that error appears in the above-identified patent and that said Letters Patent is hereby corrected as shown below:

Claim 1, column 9, lines 46 through 47, delete "at least one of an electro-magnetic and acousto-magnetic", and insert --a-- before the word "second".

Claim 13, column 10, line 29, delete "along", and insert --on--.

Claim 16, column 10, line 44, delete "devices", and insert --device--.

Claim 18, column 10, lines 54 through 55, delete "at least one of an electro-magnetic and acousto-magnetic".

Signed and Sealed this

Thirteenth Day of July, 2010

David J. Kappos
*Director of the United States Patent and Trademark Office*